United States Patent [19]
Mondak et al.

[11] Patent Number: 5,695,290
[45] Date of Patent: Dec. 9, 1997

[54] ANTIFRICTION BEARING WITH SEAL ARRANGEMENT

[75] Inventors: Stephen M. Mondak, Watertown; John A. Butine, Torrington, both of Conn.; Anthony Storey, Darlington, England

[73] Assignee: The Torrington Company, Torrington, Conn.

[21] Appl. No.: 667,162

[22] Filed: Jun. 20, 1996

Related U.S. Application Data

[60] Provisional application No. 60/000,687, Jun. 20, 1995.

[51] Int. Cl.[6] .................................................. F16C 33/78
[52] U.S. Cl. ............................................ 384/485; 384/486
[58] Field of Search ................................. 384/482, 484, 384/486, 485, 140

[56] References Cited

U.S. PATENT DOCUMENTS

| | | |
|---|---|---|
| 3,741,615 | 6/1973 | Otto . |
| 4,428,586 | 1/1984 | Romero . |
| 4,434,985 | 3/1984 | Sonnerat . |
| 4,792,242 | 12/1988 | Colanzi et al. ................ 384/482 |
| 4,958,942 | 9/1990 | Shimizu . |
| 5,005,992 | 4/1991 | Dreschmann et al. ........... 384/482 |
| 5,042,822 | 8/1991 | Dreschmann et al. . |
| 5,149,207 | 9/1992 | Vignoito . |
| 5,201,533 | 4/1993 | Lederman . |
| 5,292,199 | 3/1994 | Hosbach et al. . |
| 5,385,352 | 1/1995 | Kurose . |

FOREIGN PATENT DOCUMENTS

| | | |
|---|---|---|
| 0 276 877 | 1/1988 | European Pat. Off. . |
| 2 159 587 | 12/1985 | United Kingdom . |
| 2 165 594 | 4/1986 | United Kingdom . |
| 2 174 766 | 11/1986 | United Kingdom . |

*Primary Examiner*—Lenard A. Footland
*Attorney, Agent, or Firm*—John C. Bigler

[57] ABSTRACT

A spherical roller bearing has a seal at each axial end of the inner ring-outer ring annulus. Each seal has two spaced apart metal parts. Elastomeric seal lips are bonded to one metal part and extend into wiping contact with the other metal part. The spherical roller bearings described have three seal lips. In one embodiment two seal lips are bonded to one metal part and one seal lip is bonded to the other metal part. In the other embodiment the three seal lips are bonded to one metal part.

9 Claims, 3 Drawing Sheets

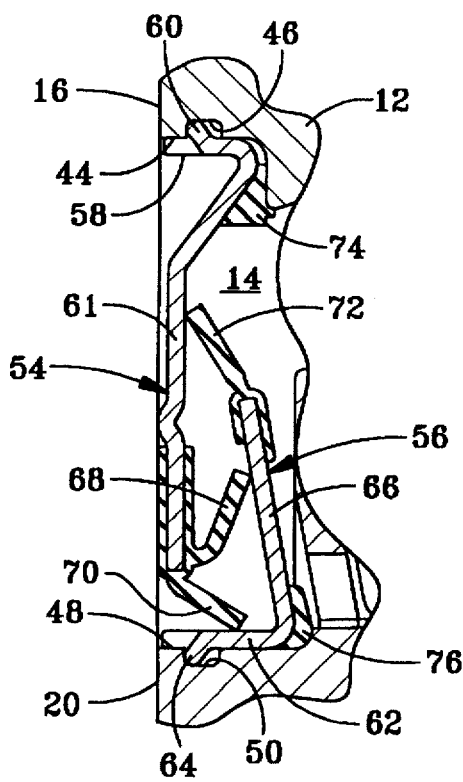
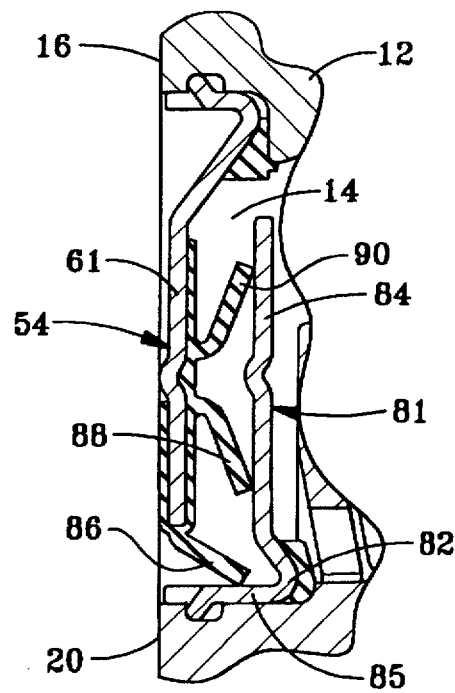
FIG. 2
FIG. 5
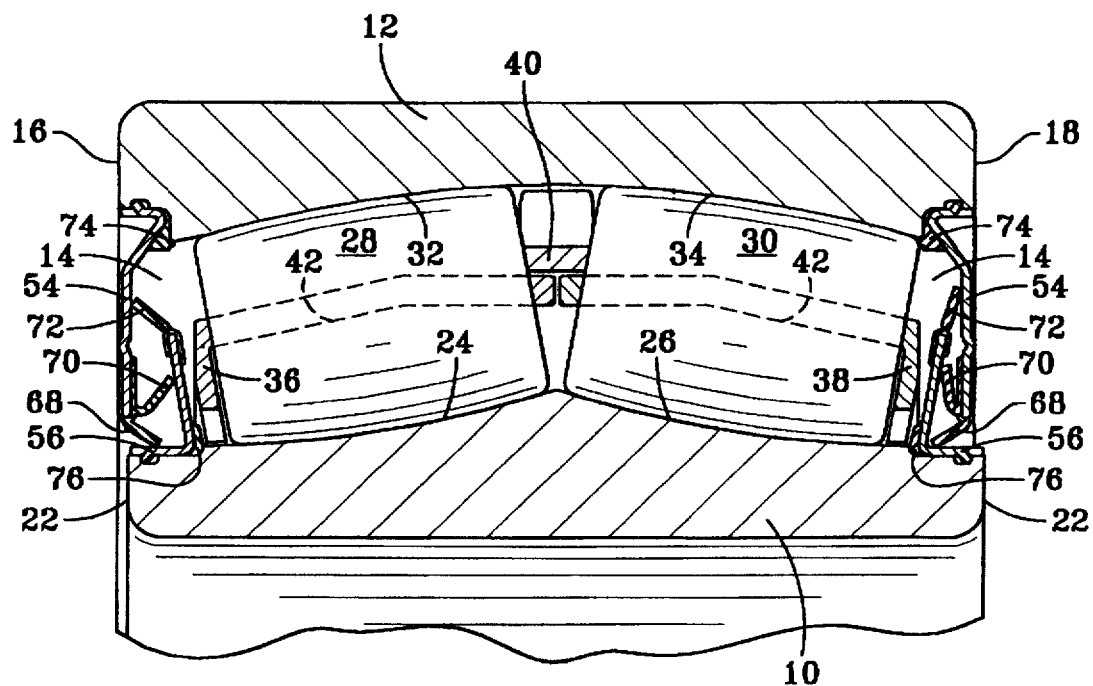
FIG. 3

ANTIFRICTION BEARING WITH SEAL ARRANGEMENT

This application claims benefit of United States provisional application 60/000,687 filed Jun. 20, 1995.

BACKGROUND OF THE INVENTION

This invention relates to antifriction bearings. More particularly, this invention is a new antifriction bearing including a novel sealing arrangement.

Double row spherical roller bearings have been manufactured for some time. The structure of the typical double row spherical roller bearing is such that very little space for seals is available unless the axial length of the bearing is increased to make room for the seal or the area of rolling contact of the rolling members with the raceways is reduced to make room for the seal. It is important that the bearing be as compact as possible and that the rolling member capacity be as great as possible with the compact structure. Thus, there are clear disadvantages when it is necessary in order to build a double row spherical roller bearing with a seal that the dimensions be different from a bearing without a seal in order to make room for the seal.

It is important that the dimensions and bearing capacity of a double row spherical bearing with the end seals be substantially the same as a double row spherical bearing without seals. U.S. Pat. No. 4,872,770 issued Oct. 10, 1989 to Thorn W. Dickinson and entitled "ANTIFRICTION BEARING WITH SEAL ARRANGEMENT" shows and describes a double row spherical bearing with a seal. The bearing has substantially the same radial length, axial length, and bearing capacity as a conventional double row spherical bearing which does not have seals. This sealed double row spherical roller bearing was intended for general use and works well for bearings operating at moderate to high speeds, where seal lip frictional forces and heating are a design consideration, and contaminates are moderate. However, a double row spherical roller bearing with a seal structure adapted to be used specifically as part of a bearing operating at relatively low speeds where seal lip friction is not a factor and the level of contaminates is high is very desirable. Such bearings, for example, could be used in steel mills.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

Briefly described, the bearing comprises an annular inner ring and an annular outer ring having an inside diameter greater than the outside diameter of the annular inner ring thereby providing an inner ring-outer ring annulus. A pair of axially spaced seals seal the inner ring-outer ring annulus. Each seal comprises a first metal part and a second metal part spaced from the first metal part. A plurality of elastomeric seal lips are bonded to at least the first metal part and extend into wiping contact with the second metal part.

The foregoing and other aspects will become apparent from the following detailed description of the invention when considered in conjunction with the accompanying drawing Figures.

BRIEF DESCRIPTION OF THE DRAWING FIGURES

FIG. 2 is a fragmentary view, on an enlarged scale, of one of the seals shown in FIG. 1;

FIG. 3 is a fragmentary view of the bearing of FIG. 1 showing the positions of the parts of the bearing with misalignment;

FIG. 5 is a fragmentary view, on an enlarged scale, of one of the seals shown in FIG. 4.

DETAILED DESCRIPTION

In the various figures, like parts are referred to by like numbers.

Figure 1:
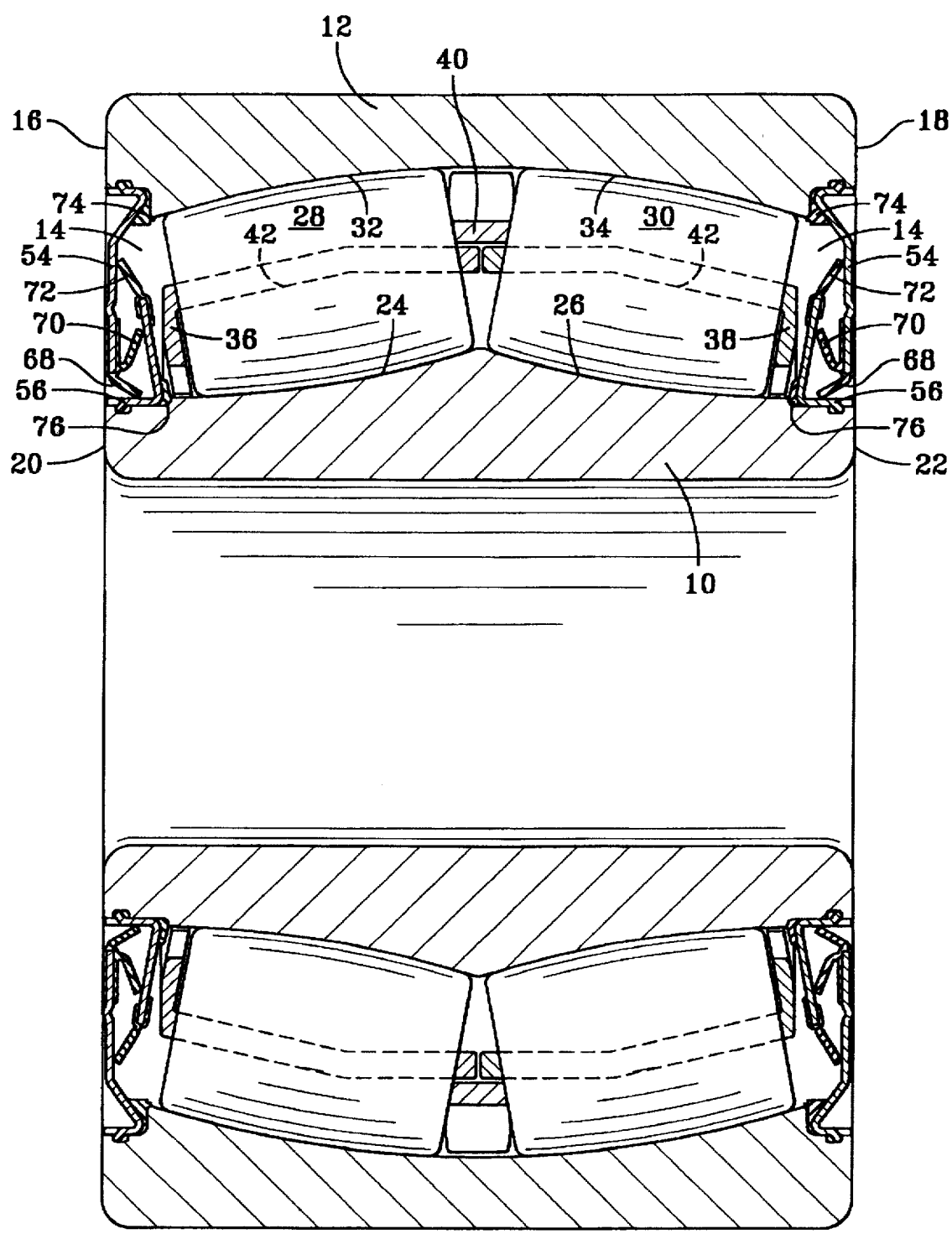
FIG. 1 is a transverse central section of a preferred embodiment of the bearing showing the positions of the parts of the bearing with no misalignment.

Referring to the drawings, and particularly to FIG. 1 through FIG. 3, a double row spherical roller bearing is shown including an annular inner ring 10 and an annular outer ring 12 having an inside diameter greater than the outside diameter of the annular inner ring thereby providing an inner ring-outer ring annulus 14. The axial length of the inner ring and the axial length of the outer ring are substantially the same. Therefore, the radially extending surfaces 16 and 18 on the axial ends of the outer ring 12 are along the same radial plane as the radially extending surfaces 20 and 22, respectively, of the inner ring 10.

The inner ring 10 has oppositely inclined raceways 24 and 26 which have a curvature conforming to the curvature of spherical rollers 28 and 30. The rollers 28 and 30 also run on raceways 32 and 34, respectively of the outer ring 12. Raceways 32 and 34 also have a curvature conforming to the curvature of spherical rollers 28 and 30.

A cage is provided for each row of rollers and comprises inwardly extending stiffening flanges 36 and 38, and an annular central ring 40. The circumferentially separated crossbars 42 interconnect the stiffening flanges and the annular central ring and provide circumferentially separated pockets. The spherical rollers are in the pockets.

The axial end portions of the outer ring 12 each have a counterbore 44. Each counterbore has an annular groove 46. The axial end portions of the inner ring 10 each have a smaller outside diameter 48 than the outside diameter of the remainder of the inner ring. Each smaller outside diameter of the inner ring has an annular groove 50.

A pair of axially spaced seals seal the inner ring-outer ring annulus. Each seal has a first metal part 54 and a second metal part 56. The first metal part has an annular portion 58 located in a corresponding outer ring 12 counterbore 44. Locking fingers 60 extend from the annular portion into the annular groove 46. The first metal part also has a portion 61 which extends substantially along the same radial plane as the corresponding inner ring and outer ring end surfaces 20 and 16, respectively, and inner ring and outer ring end surfaces 22 and 18, respectively. Preferably, the metal portion 61 extends partially across the inner ring-outer ring annulus 14 so that the metal portion 61 has a free end radially outwardly spaced from the corresponding inner ring smaller outside diameter 48.

The second metal part 56 of each seal has an annular portion 62 located on a corresponding inner ring 10 smaller outside diameter 48. Locking fingers 64 extend into the corresponding annular groove 50. The second metal part also has a portion 66 axially inwardly spaced from the corresponding portion 61 of the first metal part 54. Metal portion 66 extends radially outwardly and axially outwardly partially across the inner ring-outer ring annulus to provide a free end radially inwardly spaced from the corresponding outer ring 12 counterbore 44.

A plurality of elastomeric seal lips are bonded to the first metal part 61 of each seal. In the embodiment of FIG. 1 through FIG. 3, two elastomeric seal lips 68 and 70 are bonded to the free end of the first metal part. Seal lip 68 extends radially inwardly and axially inwardly into wiping contact with the annular portion 62 of the corresponding second metal part 56. In the embodiment of FIG. 1 through FIG. 3, the seal lip 70 extends radially outwardly and axially inwardly into wiping contact with the second metal portion 66. However, if desired, the seal lip 70 might extend in a different direction. For example, the seal lip 70 might extend radially inwardly and axially inwardly into wiping contact with the second metal portion 66.

In the embodiment of FIG. 1 through FIG. 3, an elastomeric seal lip 72 is bonded to the free end of the second metal part 56. Seal lip 72 extends radially outwardly and axially outwardly into wiping contact with portion 61 of the first metal part 54. Seal lips 68, 70, and 72 are positioned to provide maximum resistance to grease flow out of the bearing.

The metal parts of the seal may be made of spring tempered material with formed spring locking fingers. These snap into the grooves in the rings at assembly to provide positive mechanical retention of the seal, resisting dislodging of the seal during handling and installation or during relube.

A bonded elastomer 74 forms a positive compression seal on the outer ring 12, and a bonded elastomer 76 forms a positive compression seal on the inner ring 10. Other alternatives may utilize a separate o-ring (not shown) or molded seal (not shown) to provide a compression packing seal between the seal and rings.

Figure 4:
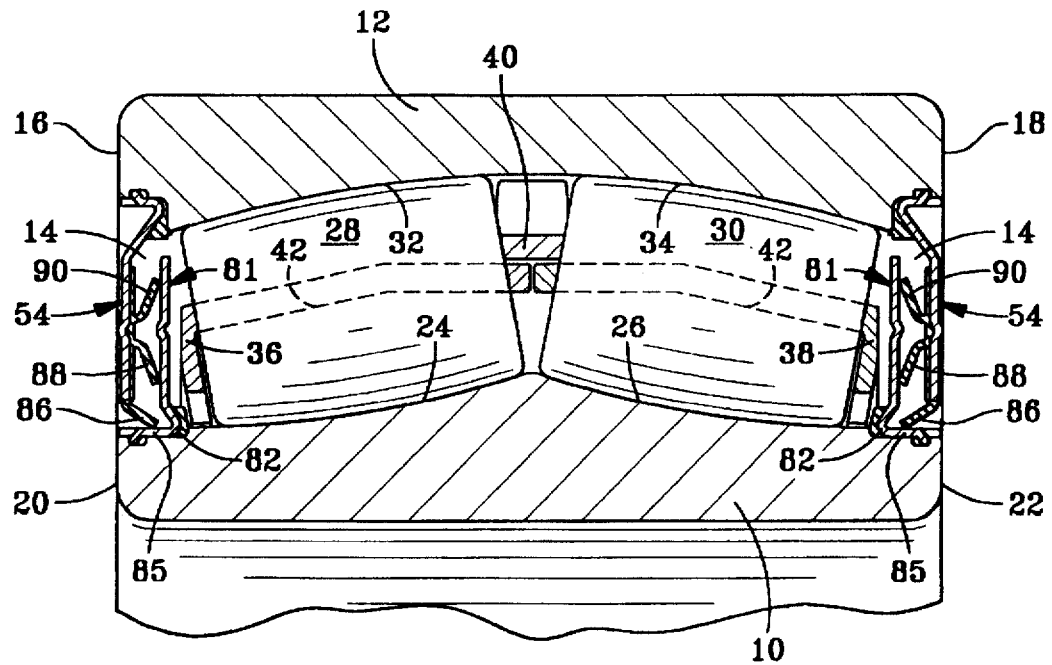
FIG. 4 is a partial transverse central section of a second preferred embodiment of the bearing showing the positions of the parts with no misalignment.
Figure 6:
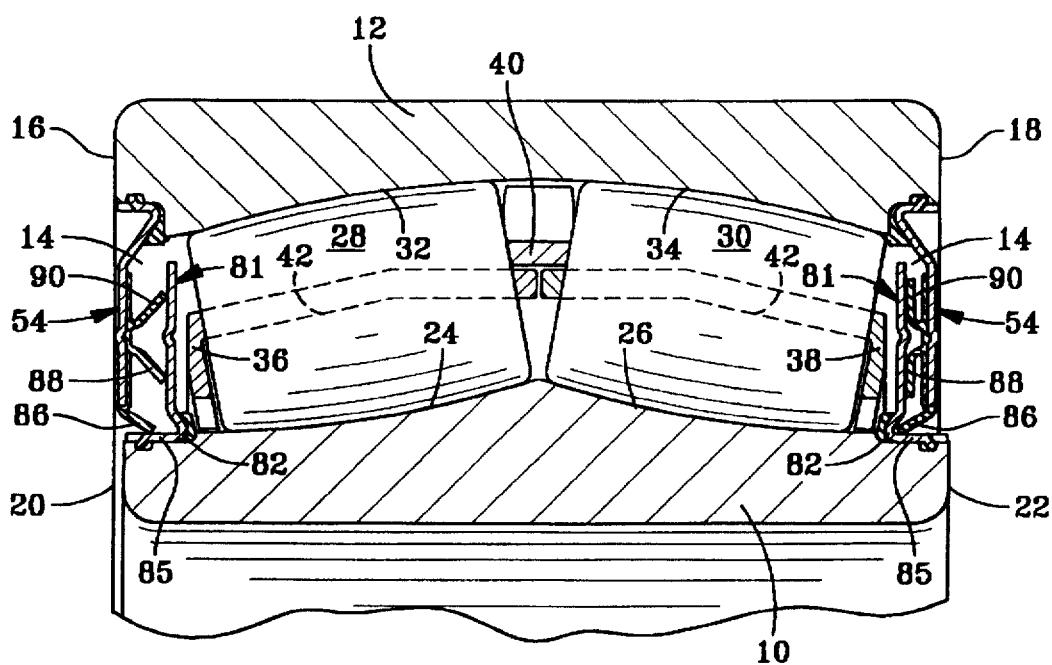
FIG. 6 is a partial transverse central section of the second preferred embodiment showing the positions of the parts with misalignment.

In the embodiment of FIG. 4 through FIG. 6, a pair of axially spaced seals seal the inner ring-outer ring annulus. The structure of the first metal part of each seal is the same as the structure of the first metal part of the seals shown and described in FIG. 1 through FIG. 3. However, the second metal part of the seal has a bend 82 extending from the axially innermost end of the annular portion 62 in a radially outwardly and axially outwardly direction. At the radially outer end of the bend, the second metal part 81 has a portion 84 axially spaced inwardly from and substantially parallel to the portion 61 of the first metal part. Portion 84 extends partially across the inner ring-outer ring annulus.

Elastomeric seal lip 86 is bonded to the free end of portion 61 of the first metal part and extends radially inwardly and axially inwardly into wiping contact with the annular portion 85 of the second metal part. Elastomeric seal lips 88 and 90 are bonded to the portion 61 at approximately its radial mid-point. Seal lip 88 extends radially inwardly and axially inwardly into wiping contact with the corresponding second metal part portion 84. Seal lip 90 extends radially outwardly and axially inwardly into wiping contact with the corresponding portion 84 of the second metal part. Seal lips 86 and 90 provide maximum resistance to grease flow out of the bearing. Seal lip 88 provides resistance to contaminates flowing into the bearing.

The radial length, axial length, and bearing capacity of the bearings shown and described herein are substantially the same as the radial length, axial length, and bearing capacity of a conventional double row spherical roller bearing which does not have seals.

Though the new seal configuration is described herein with a double row spherical roller bearing, it may be used with other similar type bearings, such as bearings having only one row or circle of rolling members in the annulus.

Having described the invention, what is claimed is:

1. A bearing comprising:

an annular inner ring having an annular groove at each axial end;

an annular outer ring having an inside diameter greater than the outside diameter of the annular inner ring thereby providing an inner ring-outer ring annulus;

a pair of axially spaced annular seals sealing the inner ring-outer ring annulus, each seal comprising:

a first metal part mounted on the annular outer ring;

a second metal part mounted on the annular inner ring, spaced from the first metal part and having a portion extending into the annular groove;

and a plurality of elastomeric seal lips bonded to at least the first metal part and extending into wiping contact with the second metal part.

2. A bearing in accordance with claim 1 wherein:

there are three elastomeric seal lips.

3. A bearing in accordance with claim 2 wherein:

the first metal part has a portion extending partially across the inner ring- outer ring annulus thus providing a free end radially spaced from the inner ring;

the second metal part has an annular portion located on the inner ring and also having a portion axially inwardly spaced from the first metal portion and extending partially across the inner ring -outer ring annulus;

one elastomeric seal lip is bonded to the free end of the first metal part and extends radially inwardly and axially inwardly into contact with the annular portion of the second metal part;

a second elastomeric seal lip and a third elastomeric seal lip bonded to the first metal part;

the second elastomeric seal lip extending radially inwardly and axially inwardly into contact with the portion of the second metal part portion which is axially inwardly spaced from the first metal portion;

the third elastomeric seal lip extending radially outwardly and axially inwardly into contact with the portion of the second metal part portion which is axially inwardly spaced from the first metal portion.

4. A bearing in accordance with claim 2 wherein:

the first metal part has a portion extending partially across the inner ring- outer ring annulus thus providing a free end radially spaced from the inner ring;

the second metal part portion located on the inner ring and axially inwardly spaced from the first metal part portion extending partially across the inner ring- outer ring annulus extends partially across the inner ring-outer ring annulus, thus providing a free end radially inwardly spaced from the outer ring;

a first elastomeric seal lip and a second elastomeric seal lip are bonded to the free end of the first metal part;

the first elastomeric seal lip extending radially inwardly and axially inwardly into contact with the annular portion of the corresponding second metal part, the second elastomeric seal lip extending radially outwardly and axially inwardly into contact with the second metal portion extending partially across the inner ring-outer ring annulus; and a third elastomeric seal lip bonded to the free end of the second metal part and extending radially outwardly and axially outwardly into contact with the first metal part.

5. A bearing comprising:

an annular inner ring;

an annular outer ring having an inside diameter greater than the outside diameter of the annular inner ring thereby providing an inner ring- outer ring annulus, the axial length of the inner ring and the axial length of the outer ring being substantially the same;

the axial end portions of the outer ring each having a counterbore, and each counterbore having an annular groove;

the axial end portions of the inner ring each having a smaller outside diameter than the outside diameter of the remainder of the inner ring, each smaller outside diameter of the inner ring having an annular groove;

a pair of axially spaced annular seals sealing the inner ring-outer ring annulus;

each seal having a first metal part, and a second metal part;

the first metal part of each seal having an annular portion located in a corresponding outer ring counterbore, the annular portion having locking fingers extending into the counterbore annular groove, the first metal part also having a portion extending substantially along the same radial plane as the corresponding inner ring and outer ring end surfaces and partially across the inner ring-outer ring annulus thus providing a free end radially outwardly spaced from the corresponding inner ring smaller outside diameter;

the second metal part of each seal having an annular portion located on a corresponding inner ring smaller outside diameter, the annular portion having locking fingers extending into the corresponding smaller diameter annular groove, the second metal part also having a portion axially inwardly spaced from the corresponding first metal part portion which extends substantially along the same radial plane as the corresponding inner ring and outer ring end surfaces and extending partially across the inner ring-outer ring annulus, thus providing a free end radially inwardly spaced from the corresponding outer ring counterbore; and a plurality of elastomeric seal lips bonded to at least the first metal part of each seal and extending from the first metal part into wiping contact with the second metal part of each seal.

6. A bearing in accordance with claim 5 wherein:

there are three elastomeric seal lips.

7. A bearing in accordance with claim 6 wherein:

one elastomeric seal lip is bonded to the free end of the portion of the first metal part extending along substantially the same radial plane as the corresponding end surfaces of the inner ring and outer ring, said elastomeric seal lip extending radially inwardly and axially inwardly into contact with the annular portion of the second metal part;

a second elastomeric seal lip and a third elastomeric seal lip bonded to the first metal part portion extending substantially along the same radial plane as the corresponding inner ring and outer ring end surfaces;

the second elastomeric seal lip extending radially inwardly and axially inwardly into contact with the corresponding portion of the second metal part which extends partially across the inner ring-outer ring annulus; and the third elastomeric seal lip extending radially outwardly and axially inwardly into contact with the corresponding portion of the second metal which extends partially across the inner ring-outer ring annulus.

8. A bearing in accordance with claim 5 wherein:

a first elastomeric seal lip and a second elastomeric seal lip are bonded to the free end of the first metal part;

the first elastomeric seal lip extending radially inwardly and axially inwardly into contact with the annular portion of the corresponding second metal part, the second elastomeric seal lip extending radially outwardly and axially inwardly into contact with the second metal portion extending partially across the inner ring-outer ring annulus; and a third elastomeric seal lip bonded to the free end of the second metal part and extending radially outwardly and axially outwardly into contact with the first metal part portion extending substantially along the same radial plane as the corresponding end surfaces of the inner ring and outer ring.

9. A bearing comprising:

an annular inner ring;

an annular outer ring having an inside diameter greater than the outside diameter of the annular inner ring thereby providing an inner ring-outer ring annulus, the axial length of the inner ring and the axial length of the outer ring being substantially the same;

the axial end portions of the outer ring each having a counterbore;

the axial end portions of the inner ring each having a smaller outside diameter than the outside diameter of the remainder of the inner ring;

a pair of axially spaced annular seals sealing the inner ring-outer ring annulus;

each seal having a first metal part, and a second metal part;

the first metal part of each seal having an annular portion located in a corresponding outer ring counterbore, the first metal part also having a portion extending substantially along the same radial plane as the corresponding inner ring and outer ring end surfaces and partially across the inner ring-outer ring annulus thus providing a free end radially outwardly spaced from the corresponding inner ring smaller outside diameter;

the second metal part of each seal having an annular portion located on a corresponding inner ring smaller outside diameter, the second metal part also having a portion axially inwardly spaced from the corresponding first metal part portion which extends substantially along the same radial plane as the corresponding inner ring and outer ring end surfaces and extending partially across the inner ring-outer ring annulus, thus providing a free end radially inwardly spaced from the corresponding outer ring counterbore; and a plurality of elastomeric seal lips bonded to at least the first metal part of each seal and extending from the first metal part into wiping contact with the second metal part of each seal.

\* \* \* \* \*